(12) United States Patent
Zhang et al.

(10) Patent No.: US 12,235,805 B1
(45) Date of Patent: Feb. 25, 2025

(54) DATA REPLICATION USING REINFORCEMENT LEARNING TO DYNAMICALLY INITIATE TRANSFER OF REPLICATION DATA

(71) Applicant: Dell Products L.P., Round Rock, TX (US)

(72) Inventors: Si Zhang, Chengdu (CN); Jeff Jianfei Yang, Chengdu (CN); David Jinfeng Dai, Chengdu (CN); Pan Xiao, Chengdu (CN); Hua Peng, Chengdu (CN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/501,197

(22) Filed: Nov. 3, 2023

(30) Foreign Application Priority Data

Oct. 23, 2023 (CN) .......................... 202311387804.7

(51) Int. Cl.
*G06F 16/10* (2019.01)
*G06F 16/178* (2019.01)
*G06N 20/00* (2019.01)

(52) U.S. Cl.
CPC .......... *G06F 16/178* (2019.01); *G06N 20/00* (2019.01)

(58) Field of Classification Search
None
See application file for complete search history.

(56) References Cited

U.S. PATENT DOCUMENTS

| | | | |
|---|---|---|---|
| 2016/0026535 A1* | 1/2016 | Bhat | G06F 11/2048 714/19 |
| 2022/0107957 A1* | 4/2022 | Kumar | G06F 16/273 |
| 2024/0275814 A1* | 8/2024 | George | H04L 63/1425 |

OTHER PUBLICATIONS

"Managing Administrative Settings for Cisco DMS Components and Users"; https://www.cisco.com/c/en/us/td/docs/video/digital_media_systems/5_x/5_1/dmm/user/guide/dmm51xug/admin.html; downloaded on Sep. 27, 2023.

(Continued)

*Primary Examiner* — Jau Shya Meng
(74) *Attorney, Agent, or Firm* — Ryan, Mason & Lewis, LLP

(57) ABSTRACT

Techniques are provided for data replication using reinforcement learning to dynamically initiate the transfer of replication data. One method comprises obtaining a state for transferring replication data from a first storage system to a second storage system, wherein the state comprises an amount of replication data to be transferred to the second storage system; assigning a reward value to previously completed replication sessions based on whether a respective previously completed replication session satisfies a designated data recovery objective; determining a start time, using a reinforcement learning framework, for transferring the replication data to the second storage system, wherein the determining is based on the assigned reward values; and initiating the transfer of the replication data to the second storage system using the determined start time. The reward value for a given concurrent replication session may be based on respective replication data transfer times of multiple concurrent replication sessions.

20 Claims, 9 Drawing Sheets

(56) References Cited

OTHER PUBLICATIONS

"Windows Alternative to Allway Sync—AlternativeTo"; https://allway9.rssing.com/chan-30107246/all_p3.html; downloaded on Sep. 27, 2023.
"Maintaining Avaya Aura Session Manager 7.1" Issue 1, May 2017.
U.S. Appl. No. 18/119,954; "Efficient Table-Based Replication Between Source and Target Storage Systems", filed Mar. 10, 2023.

\* cited by examiner

FOR ONE OR MORE CONCURRENT REPLICATION SESSIONS, EACH REPLICATION SESSION TRAINS A RESPECTIVE MODEL AND THE STATE, S, FOR A GIVEN REPLICATION SESSION COMPRISES STATE OF OTHER REPLICATION SESSIONS,

WHERE STATE, $S = [l, e_s, n_s]$, $l$ INDICATES A LENGTH OF THE DIFFERENTIAL REPLICATION DATA, $e_s$ INDICATES WHETHER A REPLICATION IS CURRENTLY OCCURRING AND $n_s$ INDICATES THE NUMBER OF CONCURRENT REPLICATION SESSIONS;

WHILE THE LAST REPLICATION IS COMPLETED AND NEW DIFFERENTIAL REPLICATION DATA APPEARS FOR GIVEN REPLICATION SESSION, UPDATE STATE FOR GIVEN REPLICATION SESSION AND DECIDE WHEN TO TRANSFER NEW DIFFERENTIAL REPLICATION DATA, AS FOLLOWS:

- INITIALIZE ACTION-VALUE FUNCTION, WHERE TERMINAL STATE OCCURS WHEN THERE IS NO LONGER ANY NEW DIFFERENTIAL REPLICATION DATA TO TRANSFER;
- REPEAT FOR EACH EPISODE (TIME FROM WHEN NEW DIFFERENTIAL REPLICATION DATA APPEARS UNTIL NEW DIFFERENTIAL REPLICATION DATA HAS BEEN TRANSFERRED):

1. GET AN INITIAL STATE, S;
  2. CHOOSE AN ACTION, A, FROM CURRENT STATE, S, TO A NEW STATE USING A POLICY DERIVED FROM THE ACTION-VALUE FUNCTION;
     - USE A GREEDY COEFFICIENT TO CHOOSE AN ACTION, A;
     - WAIT UNTIL NEW DIFFERENTIAL REPLICATION DATA HAS BEEN TRANSFERRED AND DETERMINE REWARD;
     - UPDATE ACTION-VALUE FUNCTION AND NEW STATE
  3. REPEAT STEP 2 UNTIL TERMINAL STATE IS REACHED

FIG. 6

DATA REPLICATION USING REINFORCEMENT LEARNING TO DYNAMICALLY INITIATE TRANSFER OF REPLICATION DATA

RELATED APPLICATION(S)

The present application claims priority to Chinese Patent Application No. 202311387804.7, filed Oct. 23, 2023, and entitled "Data Replication Using Reinforcement Learning to Dynamically Initiate Transfer of Replication Data," which is incorporated by reference herein in its entirety.

BACKGROUND

Many information processing systems are configured to replicate data from one storage system to another storage system, possibly at different physical sites. In some cases, such arrangements are utilized to support disaster recovery functionality within the information processing system. For example, an enterprise may replicate data from a production data center to a disaster recovery data center. In the event of a disruption at the production data center, for example, applications can be started at the disaster recovery data center using the data that has been replicated to the disaster recovery data center so that the enterprise can recover from the disruption.

SUMMARY

Illustrative embodiments of the disclosure provide techniques for data replication using reinforcement learning to dynamically initiate a transfer of replication data. An exemplary method comprises obtaining a state of an information technology infrastructure for transferring replication data from a first storage system to a second storage system, wherein the state comprises an amount of replication data to be transferred to the second storage system; assigning a reward value to one or more previously completed replication sessions based at least in part on whether a respective previously completed replication session satisfies a designated data recovery objective; determining a start time, using a reinforcement learning framework, for transferring the replication data to the second storage system, wherein the determining is based at least in part on one or more of the assigned reward values; and initiating the transfer of the replication data from the first storage system to the second storage system using the determined start time.

Illustrative embodiments can provide significant advantages relative to conventional replication techniques. For example, problems associated with statically initiated data replication techniques are overcome in one or more embodiments by dynamically determining a start time for transferring the replication data using reinforcement learning techniques.

These and other illustrative embodiments include, without limitation, methods, apparatus, networks, systems and processor-readable storage media.

BRIEF DESCRIPTION OF THE DRAWINGS

FIG. 6 is a process diagram illustrating an exemplary implementation of a process for data replication using reinforcement learning to dynamically initiate the transfer of replication data in an illustrative embodiment;

DETAILED DESCRIPTION

Figure 1:
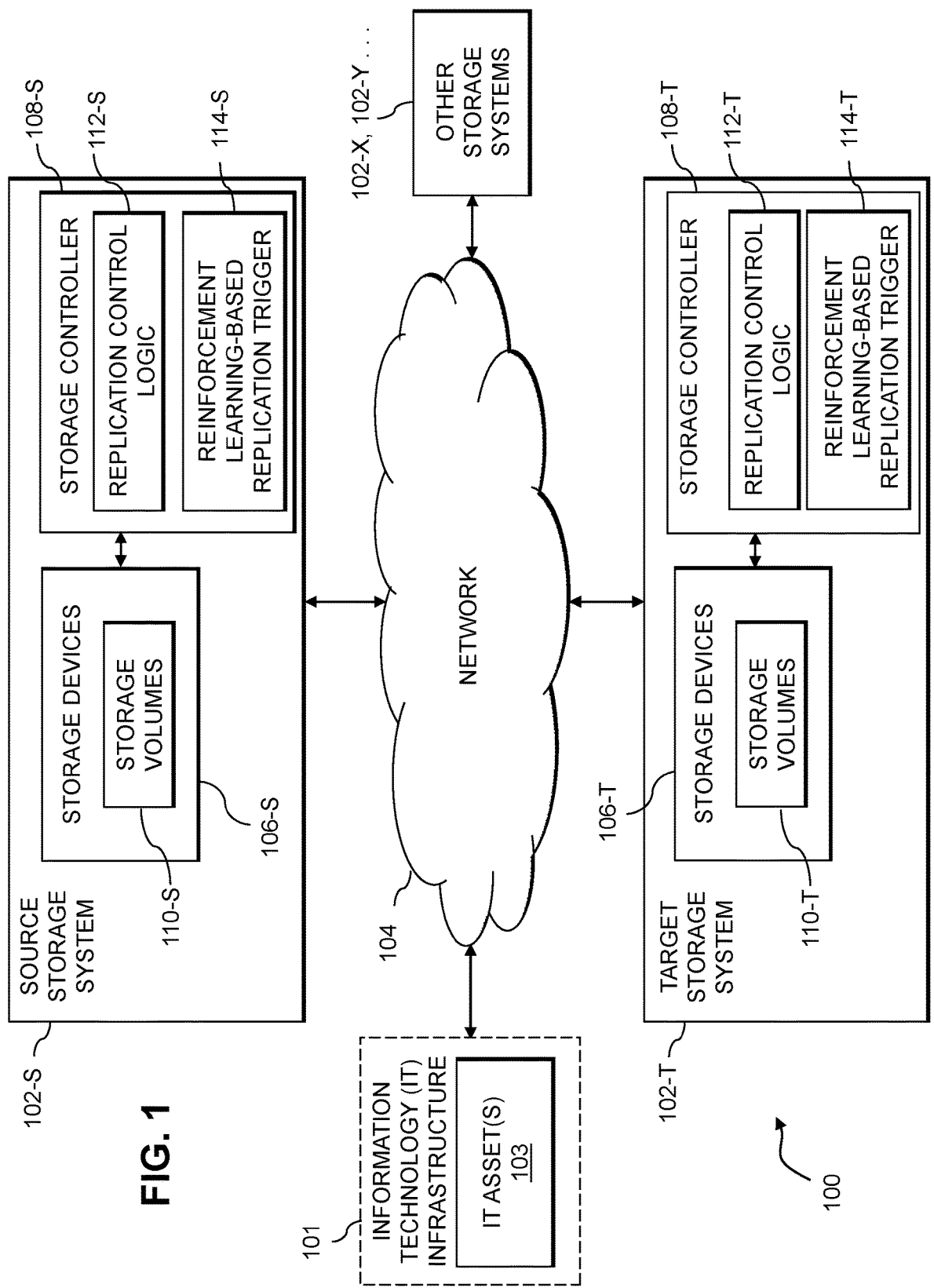
FIG. 1 is a block diagram of an information processing system configured for data replication using reinforcement learning to dynamically initiate the transfer of replication data in an illustrative embodiment.

Illustrative embodiments will be described herein with reference to exemplary information processing systems and associated computers, servers, storage devices and other processing devices. It is to be appreciated, however, that these and other embodiments are not restricted to the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other cloud-based system that includes one or more clouds hosting multiple tenants that share cloud resources, as well as other types of systems comprising a combination of cloud and edge infrastructure. Numerous different types of enterprise computing and storage systems are also encompassed by the term "information processing system" as that term is broadly used herein.

Remote asynchronous replication techniques replicate data to a given destination, where synchronization of the replication data can be started manually or automatically based on a designated recovery point objective (RPO). An RPO specifies, for example, an acceptable amount of data, typically measured in units of time, that may be lost due to a failure or other disruption.

Existing automatic asynchronous replication techniques are based on a fixed time interval, in a static automatic mode, where a transfer of the replication data (e.g., changed data) is initiated using a fixed time interval based on the RPO interval. Thus, the RPO interval establishes the time of the next transfer of replication data (e.g., as part of a synchronization process). In some automatic asynchronous replication implementations, a given replication session transfers the changed data using snapshots, and a snapshot is taken when the RPO interval arrives. The data change size (e.g., differential data) is calculated based on differences between two subsequent snapshots. The time to complete the synchronization depends on the transfer data size and the network bandwidth. The network bandwidth can be impacted by the number of synchronization replication sessions or other relative settings, such as bandwidth throttling.

One technical problem with existing asynchronous replication techniques is that the synchronization duration (e.g., the duration of the transfer of the replication data) is unpredictable, and the synchronization can take a long time when the load is large, and/or when the bandwidth is small. Further, typical existing asynchronous replication techniques do not consider the amount of time that will be needed to transfer the replication data. Before a given synchronization is completed, the remote site cannot update the data. Therefore, when the synchronization process is longer, more data is at risk of being lost when a failure occurs before the synchronization process has finished. As noted above, existing automatic replication techniques employ a fixed start time, based on the RPO, for each synchronization. The synchronization time, however, (e.g., the time duration of the transfer of the replication data) varies based on the amount of replication data to be transferred. Thus, in certain situations, the RPO may not be met.

Another technical problem with existing automatic replication techniques is related to input-output (IO) bursts and network traffic congestion. In some storage products, for example, multiple replication sessions may have the same RPO start point, which causes many sessions to start the synchronization at the same time. For example, in some storage products, replication sessions are created using a graphical user interface, and multiple file system replication sessions will be created at substantially the same time. These file system replication sessions and related replication data transfers will have approximately the same start time and RPO time, potentially repeatedly causing IO bursts and traffic congestion.

In one or more embodiments of the present disclosure, data replication techniques are provided that employ reinforcement learning to dynamically initiate the transfer of replication data. The disclosed dynamically initiated data replication techniques consider the size of changed data and the synchronization time. The disclosed dynamically initiated data replication techniques, in at least some embodiments, solve the repeated IO burst problem, as each replication session self-decides its own start time for each transfer of replication data. In at least one embodiment, the disclosed dynamically initiated data replication techniques are implemented using a reinforcement learning framework. The disclosed asynchronous replication techniques consider the amount of time that will be needed to transfer the replication data and aim to ensure that the remote data can be restored back to any timepoint that does not exceed the RPO interval.

FIG. 1 shows an information processing system 100 configured in accordance with an illustrative embodiment. The information processing system 100 comprises a source storage system 102-S, a target storage system 102-T, and a plurality of other storage systems respectively denoted 102-X, 102-Y, and so on, all of which are configured to communicate with one another over a network 104. Different pairs of the storage systems 102 are illustratively configured to participate in at least one replication process with one another, such as an asynchronous replication process, in which one or more logical storage volumes are replicated from a source storage system such as source storage system 102-S to a target storage system 102-T, possibly with involvement of one or more host devices. The one or more storage volumes that are replicated from the source storage system 102-S to the target storage system 102-T are illustratively part of a designated consistency group. Additionally or alternatively, the source storage system 102-S can serve as a target storage system of another replication process in which the target storage system 102-T serves as a source storage system.

Accordingly, it is to be appreciated that each of the storage systems 102 can be configured to operate as both a source storage system for one or more replication processes, and as a target storage system for one or more other replication processes, relative to one or more other ones of the storage systems 102.

The storage systems 102 can comprise, for example, respective storage arrays, storage clusters, or other types of storage systems, in any combination.

Also coupled to the network 104 is an information technology (IT) infrastructure 101 comprising one or more IT assets 103. The IT assets 103 may comprise physical and/or virtual computing resources in the IT infrastructure 101. Physical computing resources may include physical hardware such as servers, host devices, storage systems, networking equipment, Internet of Things (IoT) devices, and other types of processing and computing devices including desktops, laptops, tablets, smartphones, etc. Virtual computing resources may include virtual machines (VMs), containers, etc.

The IT assets 103 of the IT infrastructure 101 may host applications that are utilized by respective one or more client devices, such as in accordance with a client-server computer program architecture. In some embodiments, the applications comprise web applications designed for delivery from assets in the IT infrastructure 101 to users (e.g., of client devices) over the network 104. Various other examples are possible, such as where one or more applications are used internal to the IT infrastructure 101 and not exposed to the client devices. It should be appreciated that, in some embodiments, some of the IT assets 103 of the IT infrastructure 101 may themselves be viewed as applications or more generally software or hardware that is to be tested. For example, individual ones of the IT assets 103 that are virtual computing resources implemented as software containers may represent software. As another example, individual ones of the IT assets 103 that are physical computing resources may represent hardware devices.

The IT assets 103 in such an arrangement illustratively provide compute services such as execution of one or more applications on behalf of one or more users. Such applications illustratively generate IO operations that are processed by a corresponding one of the storage systems 102. The term "input-output" as used herein refers to at least one of input and output. For example, IO operations may comprise write requests and/or read requests directed to logical addresses of a particular logical storage volume of a given one of the storage systems 102. These and other types of IO operations are also generally referred to herein as IO requests.

The term "user" herein is intended to be broadly construed so as to encompass numerous arrangements of human, hardware, software or firmware entities, as well as combinations of such entities.

The source storage system 102-S comprises a plurality of storage devices 106-S and an associated storage controller 108-S. The storage devices 106-S store storage volumes 110-S. The storage volumes 110-S illustratively comprise respective logical units (LUNs) or other types of logical storage volumes.

Similarly, the target storage system 102-T comprises a plurality of storage devices 106-T and an associated storage controller 108-T. The storage devices 106-T store storage volumes 110-T, at least a portion of which represent respective LUNs or other types of logical storage volumes that are replicated from the source storage system 102-S to the target storage system 102-T in accordance with a given replication process.

Each of the other storage systems such as 102-X and 102-Y is assumed to be configured to include storage devices and a storage controller, in a manner similar to that illustrated for source and target storage systems 102-S and 102-T in the figure.

Compute and/or storage services may be provided for users under a Platform-as-a-Service (PaaS) model, an Infrastructure-as-a-Service (IaaS) model, a Function-as-a-Service (FaaS) model and/or a Storage-as-a-Service (STaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise.

The storage devices 106 of the storage systems 102 implement LUNs or other logical storage volumes configured to store data. Such data in some embodiments herein illustratively comprises a plurality of files, which can each comprise, for example, one or more pages, blocks or other types of objects, such as at least a portion of a LUN or other logical storage volume, and the term "file" as used herein is therefore intended to be broadly construed. A file may be viewed as an example of what is still more generally referred to herein as a "data item." A given "data item" as that term is broadly used herein may alternatively comprise multiple files, or a portion of a file.

The IT assets 103 interact with the storage systems 102 utilizing read and write commands as well as other types of commands that are transmitted over the network 104. Such commands in some embodiments more particularly comprise Small Computer System Interface (SCSI) commands of a SCSI access protocol and/or Non-Volatile Memory Express (NVMe) commands of an NVMe access protocol, although other types of commands can be used in other embodiments. A given IO operation as that term is broadly used herein illustratively comprises one or more such commands. References herein to terms such as "input-output" and "IO" should be understood to refer to input and/or output. Thus, an IO operation relates to at least one of input and output.

Examples of IO operations configured in accordance with NVMe command features and functionality are described in the NVMe Base Specification, Revision 2.0b, Jan. 6, 2022, which is incorporated by reference herein. Other NVMe storage access protocols of this type that may be utilized in illustrative embodiments disclosed herein include NVMe/FC, NVMeoF and NVMe/TCP.

Also, the term "storage device" as used herein is intended to be broadly construed, so as to encompass, for example, a logical storage device such as a LUN or other logical storage volume. A logical storage device can be defined in the storage systems 102 to include different portions of one or more physical storage devices. Storage devices 106 may therefore be viewed as comprising respective LUNs or other logical storage volumes.

The storage controller 108-S of source storage system 102-S in the FIG. 1 embodiment includes replication control logic 112-S and reinforcement learning-based replication trigger 114-S. It can also include additional elements, such as a checksum generator, a hash value generator or another mechanism for generating content-based identifiers for respective data files.

Similarly, the storage controller 108-T of target storage system 102-T includes replication control logic 112-T and reinforcement learning-based replication trigger 114-T. The storage controller 108-T, like the storage controller 108-S, can also include additional elements, such as a checksum generator, a hash value generator or another mechanism for generating content-based identifiers for respective data files.

The instances of replication control logic 112-S and 112-T are collectively referred to herein as replication control logic 112. Such replication control logic instances are also referred to herein as individually or collectively comprising at least a portion of a "replication engine" of the system 100. The reinforcement learning-based replication trigger 114-S and 114-T are collectively referred to herein as reinforcement learning-based replication triggers 114, as discussed further below in conjunction with FIGS. 4 through 6, for example.

The replication control logic 112 of the storage systems 102 controls performance of one or more replication processes carried out between those storage systems, which may involve one or more host devices. For example, in some embodiments, the data replicated from the source storage system 102-S to the target storage system 102-T in accordance with a given replication process controlled by the replication control logic 112 can include all of the data stored in the source storage system 102-S, or only certain designated subsets of the data stored in the source storage system 102-S, such as particular designated sets of LUNs or other logical storage volumes. Different replication processes of different types can be implemented for different parts of the stored data.

A given storage volume designated for replication from the source storage system 102-S to the target storage system 102-T illustratively comprises a set of one or more LUNs or other instances of the storage volumes 110-S of the source storage system 102-S. Each such logical storage volume illustratively comprises at least a portion of a physical storage space of one or more of the storage devices 106-S. The corresponding replicated logical storage volume of the storage volumes 110-T of the target storage system 102-T illustratively comprises at least a portion of a physical storage space of one or more of the storage devices 106-T.

The replication control logic 112 of the storage systems 102 is illustratively configured to control the performance of a dynamically initiated asynchronous data replication process utilizing the reinforcement learning-based replication trigger 114. Examples of such processes will be described in more detail below in conjunction with FIGS. 4 through 6, for example.

The storage controllers 108 of the storage systems 102 should also be understood to include additional modules and other components typically found in conventional implementations of storage controllers and storage systems, although such additional modules and other components are omitted from the figure for clarity and simplicity of illustration. For example, in some embodiments, each of the storage controllers 108 has one or more local caches or allocated portions of a global cache associated therewith, although numerous alternative arrangements are possible.

The storage controllers 108 can be implemented as respective storage processors, directors or other storage system components configured to control storage system operations relating to processing of IO operations.

It will be assumed for the following description of the FIG. 1 embodiment that there is a dynamically initiated asynchronous data replication process carried out between the source storage system 102-S and the target storage system 102-T in the system 100, utilizing their respective instances of replication control logic 112-S and 112-T and their respective reinforcement learning-based replication trigger 114-S and 114-T.

Other types of replication arrangements can be used in other embodiments. For example, the storage systems may be configurable to operate in both asynchronous and synchronous replication modes, with transitions between the modes controlled by their respective instances of replication control logic 112-S and 112-T.

A given such asynchronous replication mode illustratively comprises a cycle-based asynchronous replication process in which a consistency group comprising one or more storage volumes is replicated from the source storage system 102-S to the target storage system 102-T over a plurality of asynchronous replication cycles.

In some remote replication environments (e.g., asynchronous replication), a host device sends a given write command to one storage array (referred to as the "local" storage array), and that storage array forwards the data to the other storage array (referred to as the "remote" storage array) in accordance with a selected remote replication policy. The local storage array is therefore defined as the storage array which receives the given write command from the host, and the remote storage array is defined as the storage array which is being updated by the local array.

In general, each of the storage arrays can serve different roles for different write commands sent from different hosts, possibly even for the same logical storage device, but each specific write command may be sent from a host to only one of the storage arrays.

For example, in an active-active arrangement with asynchronous replication, one of the storage arrays is the local or source storage array and the other storage array is the remote or target storage array. For example, the local storage array is illustratively a production storage array and the remote storage array is a "remote mirror" of the production storage array, utilized to support disaster recovery.

Some embodiments utilize a Symmetrix Remote Data Facility (SRDF) arrangement to perform replication, although other replication arrangements can be used. SRDF includes multiple distinct replication modes, including SRDF/Synchronous (SRDF/S) and SRDF/Asynchronous (SRDF/A).

The source and target storage arrays in the SRDF context are referred to as R1 and R2, respectively. The logical storage devices of the source storage array are referred to as R1 devices and the logical storage devices of the target storage array are referred to as R2 devices.

SRDF/A is the asynchronous mode of SRDF, and mirrors data from the R1 devices while maintaining a dependent-write consistent copy of the data on the R2 devices at all times. The copy of the data at the secondary site is typically only seconds behind the primary site.

The above-noted synchronous and asynchronous modes of operation can be changed dynamically, and modes of operation can be specified on a device level. Again, other types of replication arrangements, involving other types and arrangements of host devices (and other IT assets) and storage systems, can be used in other embodiments.

The storage systems 102, IT assets 103 and network 104 in the FIG. 1 embodiment are assumed to be implemented using at least one processing platform each comprising one or more processing devices each having a processor coupled to a memory. Such processing devices can illustratively include particular arrangements of compute, storage and network resources. For example, processing devices in some embodiments are implemented at least in part utilizing virtual resources such as virtual machines (VMs) or Linux containers (LXCs), or combinations of both as in an arrangement in which Docker containers or other types of LXCs are configured to run on VMs.

The storage systems 102 and IT assets 103 may be implemented on respective distinct processing platforms, although numerous other arrangements are possible. For example, in some embodiments at least portions of the storage systems 102 and the IT assets 103 are implemented on the same processing platform. A given one of the storage systems 102 can therefore be implemented at least in part within at least one processing platform that implements at least a subset of the IT assets 103.

The network 104 in some embodiments may be implemented using multiple networks of different types to interconnect IT asset and storage system components of the system 100. For example, the network 104 may comprise a portion of a global computer network such as the Internet, although other types of networks can be part of the network 104, including a wide area network (WAN), a local area network (LAN), a satellite network, a telephone or cable network, a cellular network, a wireless network such as a WiFi or WiMAX network, or various portions or combinations of these and other types of networks. The network 104 in some embodiments therefore comprises combinations of multiple different types of networks each comprising processing devices configured to communicate using Internet Protocol (IP) or other related communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand (IB), Gigabit Ethernet or Fibre Channel (FC). Numerous alternative networking arrangements are possible in a given embodiment, as will be appreciated by those skilled in the art.

The IT assets 103 may comprise respective sets of IO queues and respective multi-path input-output (MPIO) drivers, with the MPIO drivers collectively comprising a multi-path layer of the IT assets 103. Path selection functionality for delivery of IO operations from the IT assets 103 to the storage systems 102 is illustratively provided in the multi-path layer by respective instances of path selection logic implemented within the MPIO drivers. The MPIO drivers may comprise, for example, otherwise conventional MPIO drivers. Other types of MPIO drivers from other driver vendors may be used in other embodiments.

The IT assets 103 can include additional or alternative components. For example, in some embodiments, the IT assets 103 comprise respective local caches, implemented using respective memories of those IT assets 103. A given such local cache can be implemented using one or more cache cards. A wide variety of different caching techniques can be used in these and other embodiments, as will be appreciated by those skilled in the art. Other examples of memories of the respective IT assets 103 that may be utilized to provide local caches include one or more memory cards or other memory devices, such as, for example, an NVMe over PCIe cache card, a local flash drive or other type of NVM storage drive, or combinations of these and other host memory devices.

An MPIO driver of a given one of the IT assets 103 is illustratively configured to deliver IO operations selected from its corresponding set of IO queues to one or more of the storage systems 102 via selected ones of multiple paths over the network 104. The sources of the IO operations stored in the set of IO queues illustratively include respective processes of one or more applications executing on the given IT asset. For example, IO operations can be generated by each of multiple processes of a database application running on the given IT asset. Such processes issue IO operations for delivery to one or more of the storage systems 102 over the network 104. Other types of sources of IO operations may be present in a given implementation of system 100.

A given IO operation is therefore illustratively generated by a process of an application running on the given IT asset, and is queued in a given one of the IO queues of that IT asset with other operations generated by other processes of that application, and possibly other processes of other applications.

One or more of the storage systems 102 may each comprise a persistent memory that is implemented using a flash memory or other type of non-volatile memory of the storage system. More particular examples include NAND-based flash memory or other types of non-volatile memory such as resistive RAM, phase change memory and spin torque transfer magneto-resistive RAM (STT-MRAM). The persistent memory is further assumed to be separate from the storage devices 106 of the storage system, although in other embodiments the persistent memory may be implemented as a designated portion or portions of one or more of the storage devices 106. For example, in some embodiments the storage devices 106 may comprise flash-based storage devices, as in embodiments involving all-flash storage arrays, or may be implemented in whole or in part using other types of non-volatile memory.

The storage systems 102 in the present embodiment may comprise additional components not explicitly shown in the figure, such as a response time control module and IO operation priority queues, illustratively configured to make use of the above-described persistent memory. For example, the response time control module may be used to implement storage array-based adjustments in response time for particular IO operations based at least in part on service level objective (SLO) information stored by the storage system in its persistent memory. The response time control module is assumed to operate in conjunction with the above-noted IO operation priority queues.

A given storage system illustratively utilizes its IO operation priority queues to provide different levels of performance for IO operations. For example, the IO operation priority queues may have respective different priority levels. The storage system may be configured to provide different priority levels for different ones of the IO operations by assigning different ones of the IO operations to different ones of the IO operation priority queues. The IO operation priority queues are illustratively associated with respective SLOs for processing of IO operations in the storage system. Process tags may be used in assigning different ones of the IO operations to different ones of the IO operation priority queues.

As mentioned above, communications between the storage systems 102 and the IT assets 103 may utilize PCIe connections or other types of connections implemented over one or more networks, using interfaces and protocols as previously described. Numerous other interfaces and associated protocols can be used in other embodiments.

One or more of the storage systems 102 in some embodiments may be implemented as part of cloud infrastructure in the form of a cloud-based system. Such a cloud-based system can additionally or alternatively be used to implement other portions of system 100, such as one or more of the IT assets 103.

The storage devices 106 of the storage systems 102 can be implemented using solid state drives (SSDs). Such SSDs are implemented using non-volatile memory (NVM) devices such as flash memory. Other types of NVM devices that can be used to implement at least a portion of the storage devices 106 include non-volatile random access memory (NVRAM), phase-change RAM (PC-RAM) and magnetic RAM (MRAM). These and various combinations of multiple different types of NVM devices or other storage devices may also be used. For example, hard disk drives (HDDs) can be used in combination with or in place of SSDs or other types of NVM devices. Accordingly, numerous other types of electronic or magnetic media can be used in implementing at least a subset of the storage devices 106.

A given one of the storage systems 102 may additionally or alternatively be configured to implement multiple distinct storage tiers of a multi-tier storage system. By way of example, a given multi-tier storage system may comprise a fast tier or performance tier implemented using flash storage devices or other types of SSDs, and a capacity tier implemented using HDDs, possibly with one or more such tiers being server based. A wide variety of other types of storage devices and multi-tier storage systems can be used in other embodiments, as will be apparent to those skilled in the art. The particular storage devices used in a given storage tier may be varied depending on the particular needs of a given embodiment, and multiple distinct storage device types may be used within a single storage tier. As indicated previously, the term "storage device" as used herein is intended to be broadly construed, and so may encompass, for example, SSDs, HDDs, flash drives, hybrid drives or other types of storage products and devices, or portions thereof, and illustratively include logical storage devices such as LUNs.

As another example, one or more of the storage systems 102 may be implemented as respective cluster storage systems each comprising a plurality of storage nodes interconnected by one or more networks.

It should therefore be apparent that the term "storage system" as used herein is intended to be broadly construed and may encompass multiple distinct instances of a commercially-available storage array.

Other types of storage products that can be used in implementing a given storage system in illustrative embodiments include software-defined storage, cloud storage, object-based storage and scale-out storage. Combinations of multiple ones of these and other storage types can also be used in implementing a given storage system in an illustrative embodiment.

In some embodiments, the storage systems 102 comprise first and second storage arrays arranged in an active-active configuration. For example, such an arrangement can be used to ensure that data stored in one of the storage arrays is replicated to the other one of the storage arrays utilizing a synchronous replication process. Such data replication across the multiple storage arrays can be used to facilitate failure recovery in the system 100. One of the storage arrays may therefore operate as a production storage array relative to the other storage array which operates as a backup or recovery storage array.

It is to be appreciated, however, that embodiments disclosed herein are not limited to active-active configurations or any other particular storage system arrangements. Accordingly, illustrative embodiments herein can be configured using a wide variety of other arrangements, including, by way of example, active-passive arrangements, active-active Asymmetric Logical Unit Access (ALUA) arrangements, and other types of ALUA arrangements. Other embodiments can be configured to utilize asymmetric namespace access (ANA) arrangements.

These and other storage systems can be part of what is more generally referred to herein as a processing platform comprising one or more processing devices each comprising a processor coupled to a memory. A given such processing device may correspond to one or more virtual machines or other types of virtualization infrastructure such as Docker containers or other types of LXCs. As indicated above, communications between such elements of system 100 may take place over one or more networks.

The term "processing platform" as used herein is intended to be broadly construed so as to encompass, by way of illustration and without limitation, multiple sets of processing devices and one or more associated storage systems that are configured to communicate over one or more networks. For example, distributed implementations of the IT assets 103 and storage systems 102 are possible, in which certain ones of the IT assets 103 and storage systems 102 reside in one data center in a first geographic location while other ones of the IT assets 103 and storage systems 102 reside in one or more other data centers in one or more other geographic locations that are potentially remote from the first geographic location. Thus, it is possible in some implementations of the system 100 for different ones of the IT assets 103 and storage systems 102 to reside in different data centers. Numerous other distributed implementations of the IT assets 103 and/or the storage systems 102 are possible.

It is to be appreciated that these and other features of illustrative embodiments are presented by way of example only and should not be construed as limiting in any way. Accordingly, different numbers, types and arrangements of system components such as IT assets 103, network 104, and storage systems 102, including their corresponding instances of replication control logic 112 and reinforcement learning-based replication trigger 114, can be used in other embodiments.

It should also be understood that the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations.

As indicated previously, illustrative embodiments overcome various drawbacks of conventional practice by configuring the system 100 to include functionality for dynamically initiated asynchronous data replication, as will now be described in more detail.

The storage controllers 108 may be viewed as illustrative examples of what are more generally referred to herein as "at least one processing device" of the system 100. Each such processing device comprises at least one processor coupled to a memory. Additionally or alternatively, each of the IT assets 103 and the storage systems 102 may similarly be viewed as an example of an apparatus comprising at least one processing device as that term is broadly used herein.

For example, as indicated previously, the first storage system may comprise a source storage system, such as source storage system 102-S, of at least one replication process and the two or more additional storage systems may comprise respective target storage systems of respective replication processes, such as target storage system 102-T. The above-noted request to replicate a particular file or other data item in such an embodiment may comprise, for example, a request to replicate the particular data item from the first storage system to the designated one of the two or more additional storage systems.

Additionally or alternatively, the first storage system may comprise a target storage system, such as target storage system 102-T, of at least one replication process and the two or more additional storage systems may comprise respective source storage systems, such as source storage system 102-S, of respective replication processes. The above-noted request to replicate a particular file or other data item in such an embodiment may comprise, for example, a request to replicate the particular data item from the designated one of the two or more additional storage systems to the first storage system.

Additional illustrative embodiments will now be described in more detail with reference to an example information processing system comprising one or more host devices or other IT assets 103 and multiple storage systems. The information processing system may be viewed as an example of system 100 that includes IT assets 103 and storage systems 102 as previously described in conjunction with the FIG. 1 embodiment.

It is assumed in the embodiments to be described that the storage systems are implemented as respective storage clusters with each such storage cluster comprising a plurality of storage nodes. A given such storage system may be viewed as comprising at least one storage array, although numerous other storage system arrangements can be utilized in other embodiments. The source and target storage systems are referred to in some description below as respective source and target clusters.

Figure 2:
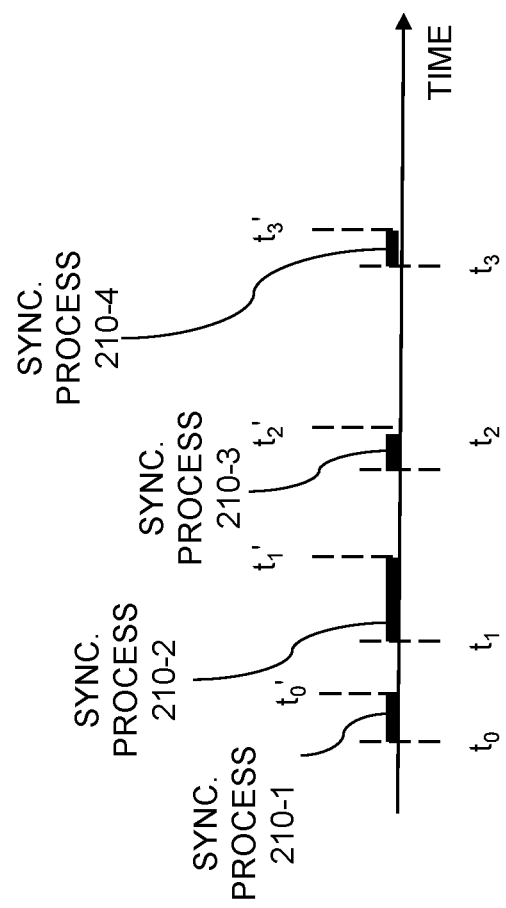
FIG. 2 illustrates a dynamic initiation of data replication in an illustrative embodiment.

FIG. 2 illustrates a dynamic initiation of data replication in an illustrative embodiment. In the example of FIG. 2, subsequent synchronization processes 210-1 through 210-4 (that transfer replication data to a remote site) follow a rule that a time gap (e.g., a time duration) between the beginning of a first synchronization process and the end of a subsequent synchronization process must be less than a specified RPO interval. Consider consecutive synchronization processes 210-1 and 210-2, for example, where the interval from the beginning ($t_0$) of synchronization process 210-1 and the end ($t_1'$) of the subsequent synchronization process 210-2 meets the condition $t_1'-t_0 \leq RPO$. Thus, even if a disaster occurs during the duration [$t_1$, $t_1'$] for synchronization process 210-2, the remote site can be restored back to the data that was replicated at time $t_0$. Similarly, for consecutive synchronization processes 210-2 and 210-3, for example, where the interval from the beginning ($t_1$) of synchronization process 210-2 and the end ($t_2'$) of the subsequent synchronization process 210-3 meets the condition $t_2'-t_1 \leq RPO$.

Figure 3:
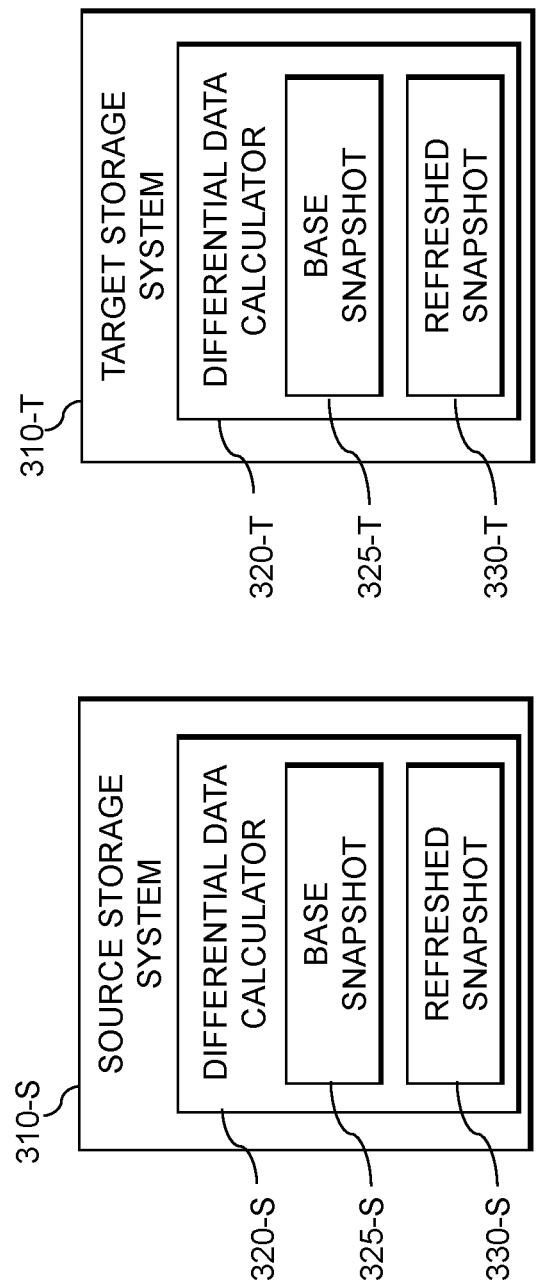
FIG. 3 illustrates a calculation of differential data in an illustrative embodiment.

FIG. 3 illustrates a calculation of differential data in an illustrative embodiment. In an asynchronous replication snapshot mechanism, before a synchronization, one snapshot, is idle and will be refreshed to calculate an amount of differential data, sometimes referred to herein as delta data, until the RPO interval comes. As noted above, an asynchronous replication process replicates one or more logical storage volumes from a source storage system 310-S to a target storage system 310-T. The source storage system 310-S comprises a differential data calculator 320-S that calculates an amount of differential data to be transferred to the target storage system 310-T. The target storage system 310-T may also comprise a differential data calculator 320-T that calculates an amount of differential data to be transferred by the target storage system 310-T, acting as a source storage system, to another target storage system.

In the example of FIG. 3, two snapshots are created on the source storage system 310-S and on the target storage system 310-T when a replication session is started. The source storage system 310-S creates a base snapshot 325-S and a refreshed snapshot 330-S. The target storage system 310-T creates a base snapshot 325-T and a refreshed snapshot 330-T.

When an initial synchronization is completed, the base snapshot 325-S, 325-T is updated with the replication data as a common base on the source storage system 310-S and on the target storage system 310-T, respectively. The differential data calculator 320-S on the source storage system 310-S then calculates the differential data amount to be transferred to the target storage system 310-T (e.g., the amount of replication data associated with the initial synchronization). During the next synchronization, the refreshed snapshot 330-S on the source storage system 310-S is refreshed and the differential data is calculated by the differential data calculator 320-S with respect to the base snapshot 325-S. After the next synchronization is completed, the base snapshot 325-T on the target storage system 310-T is refreshed and the base snapshots 325-S, 325-T on the source storage system 310-S and the target storage system 310-T are alternated as the respective new base snapshot 325-S, 325-T.

In this manner, the differential data amount is calculated for the next synchronization, as well as for specific time points, by refreshing the current refreshed snapshots 330-S, 330-T and calculating the difference with the current base snapshot 325-S, 325-T. It can be shown that the differential data is not a negative value during the relevant intervals (e.g., for a snapshot creation, a snapshot deletion, a snapshot rewrite and/or a snapshot read) and is cumulative with time.

Figure 4:
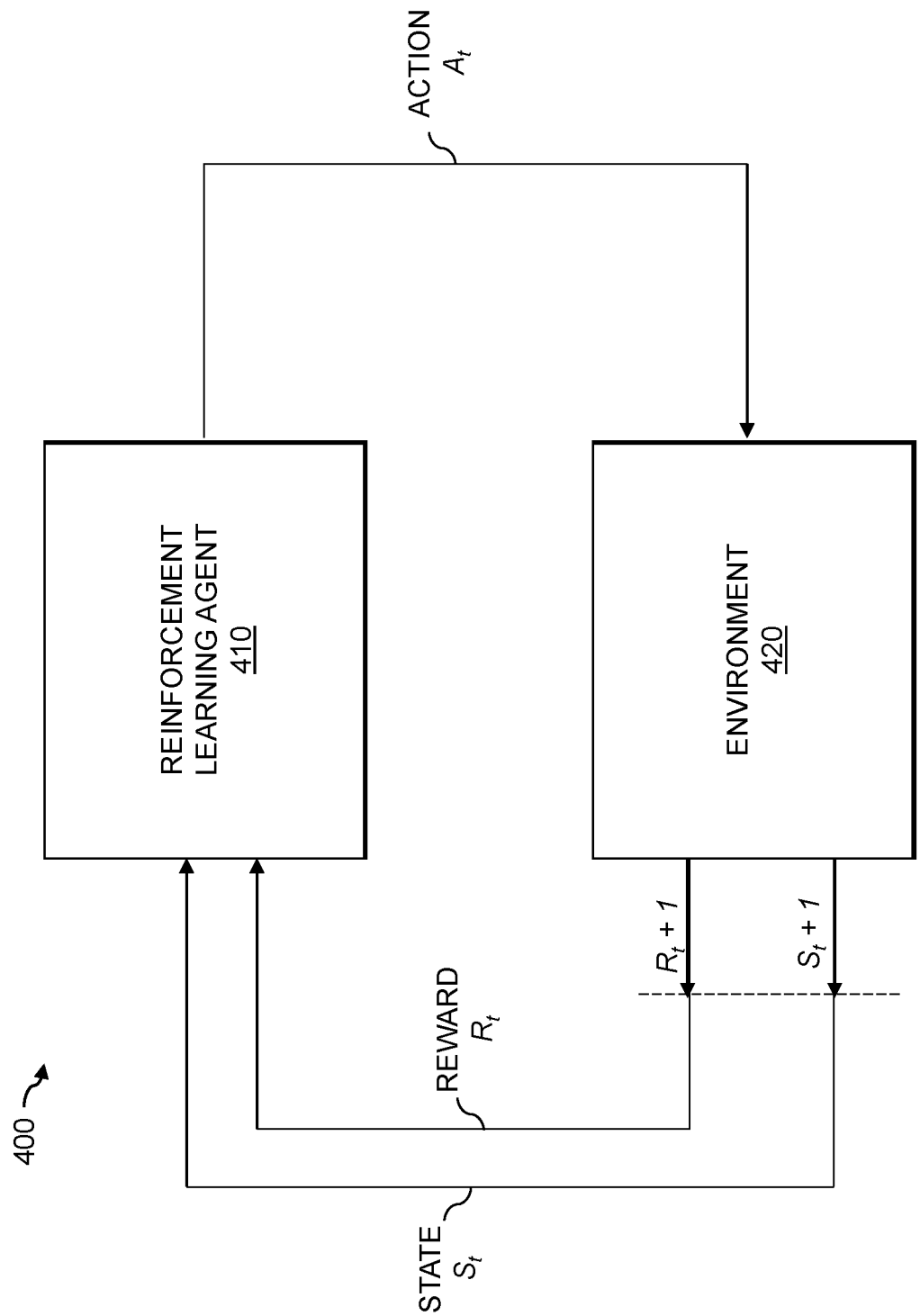
FIG. 4 shows a reinforcement learning framework for dynamically determining a time to initiate the transfer of replication data in an illustrative embodiment.

FIG. 4 shows a reinforcement learning framework for dynamically determining a time to initiate the transfer of replication data in an illustrative embodiment. In the example of FIG. 4, a reinforcement learning framework 400 includes a reinforcement learning agent 410 and an environment 420 (e.g., a VM or other IT asset to which a replication request is applied). As shown, the reinforcement learning agent 410 receives or observes a state $S_t$ at a time t. The reinforcement learning agent 410 selects an action $A_t$ based on its action selection policy, and transitions to a next state $S_{t+1}$ at a time t+1. The reinforcement learning agent 410 receives a reward $R_{t+1}$ at a time t+1. The reinforcement learning agent 410 leverages a reinforcement learning algorithm, which may include but is not limited to a Q-learning algorithm, a Deep Q Networks (DQN) algorithm, a Double DQN (DDQN) algorithm, etc., to update an action-value function $Q(S_i, A_i)$. The action-value function defines a long-term value of taking an action $A_i$ in a state $S_i$, as will be described in further detail below. Over time, the reinforcement learning agent 410 learns to pursue actions that lead to the greatest cumulative reward at any state.

In some implementations, a Q-learning control algorithm is based on a Bellman Equation that predicts an expected response of the environment 420 using trial and error to learn. The Bellman Equation may be expressed, as follows:

$$Q(S, A) \leftarrow Q(S, A) + \alpha \left[ R + \gamma \max_{a'} Q(S', a') - Q(S, A) \right],$$

where, S is a particular state value, A is an action, S' is a next state from state S by action A. R is a reward function, $\alpha$ is a learning step, that decides the speed and the variance of convergence, where $\alpha \in [0,1]$, and $\gamma$ is a discount factor, that decides the importance of future reward, where $\gamma \in [0,1]$. Q(S,A) may be referred to as an action-value function that represents the expected return from a state S by an action A. If the learning step $\alpha$ is too large, it may result in a fast convergence but causes a large variance of convergence (e.g., providing more opportunities to choose a non-optimal action). If the learning step $\alpha$ is too small, it may result in a long time to learn the optimal actions. It can be shown that a learning step $\alpha$ of 0.1 is a good choice.

In some embodiments, future states can learn a growth of the replication data to be transferred from prior states, and the total episode time includes the transfer time. Thus, a large value may be used for the discount factor, $\gamma$, such as $\gamma=0.9$, to make future and past states highly related.

Techniques for defining states, actions and rewards will now be described. A state space S includes a set of possible state values. A state $S_t \in S$ is a vector of values from $S=\{S_1, S_2, \ldots, S_n\}$ at time step t. In some embodiments, $S_t$ comprises a length of the differential replication data to be transferred, an indication of whether a replication session is currently occurring and a number of concurrent replication sessions.

The action space will now be described. The reinforcement learning agent 410, as noted above, observes the current state $S_t$ at each time step t and takes an action $A_t$. In some embodiments, the action $A_t$ involves two possible alternative actions: initiating a transfer of the replication data or waiting to initiate the transfer.

Figure 5:
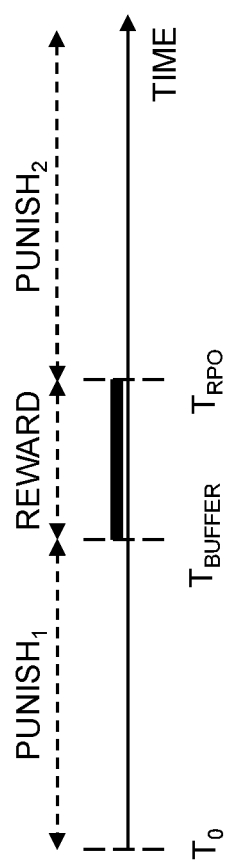
FIG. 5 illustrates an exemplary policy for determining a reward value in the reinforcement learning framework of FIG. 4 in an illustrative embodiment.

FIG. 5 illustrates an exemplary policy for determining a reward value in the reinforcement learning framework of FIG. 4 in an illustrative embodiment. One or more aspects of the disclosure recognize that it is desirable to complete a transfer of the replication data in a time that is less than or equal to the designated data recovery objective, such as an RPO (ensuring that the RPO is satisfied). In the example of FIG. 5, a configurable time range that starts at a designated time, $T_{Buffer}$, and ends at a time, $T_{RPO}$, is defined that assigns a positive reward to transfer completion times occurring in the configured time range. The configured time range (between $T_{Buffer}$ and $T_{RPO}$) may be small relative to the RPO duration. $T_0$ indicates the replication data transfer initiation time.

In addition, for transfer completion times that occur prior to the designated time, $T_{Buffer}$, may be assigned a first punishment value, $PUNISH_1$, (e.g., a negative reward) and transfer completion times that occur after the designated time, $T_{RPO}$, may be assigned a second punishment value, $PUNISH_2$. In some embodiments, the first punishment value, $PUNISH_1$, may be smaller than the second punishment value, $PUNISH_2$. In other embodiments, the first punishment value, $PUNISH_1$, and the second punishment value, $PUNISH_2$, may be the same value.

In one exemplary implementation, when an episode time, $T_{Episode}$ (e.g., the time between initiating a first transfer of replication data and completing a second transfer of replication data, as discussed above in conjunction with FIG. 2), occurs in one of the following time ranges:

$T_{Buffer} \leq T_{Episode} \leq T_{RPO}$: a positive reward value of 10 is assigned;

$T_{Episode} < T_{Buffer}$: a negative reward value (e.g., $PUNISH_1$) of $-1 + \dfrac{T_{Episode}}{T_{Buffer}}$ is assigned; and $T_{Episode} > T_{RPO}$: a negative reward value (e.g., $PUNISH_2$) of $$-\frac{T_{Episode}}{T_{RPO}}$$

is assigned.

FIG. 6 is a process diagram illustrating an exemplary implementation of a process 600 for data replication using reinforcement learning to dynamically initiate the transfer of replication data in an illustrative embodiment. In the example of FIG. 6, one or more concurrent replication sessions train a respective model. The state, S, for each replication session comprises state for the other replication sessions. The state, S, comprises an indication, l, of a length of the differential replication data; an indication, $e_s$, of whether a replication is currently occurring and an indication, $n_s$, of a number of concurrent replication sessions.

The process 600 updates the state for a given replication session and decides when to transfer the new differential replication data, while the last replication is completed and new differential replication data appears for a given replication session. The action-value function, Q(S,A), is initialized and represents the expected return from a state S by an action A.

For each episode (e.g., a time from when the new differential replication data appears until the new differential replication data has been transferred): an initial state S is obtained, an action A is selected from the current state, S, using a policy derived from the action-value function and repeating the action selection until the terminal state is reached (e.g., when there is no longer any new differential replication data to transfer).

In at least some embodiments, the action selection uses a greedy coefficient, $\epsilon$, to choose a particular action, A, (such as a value of $\epsilon=0.1$), where:

$$\pi(a|s) = \begin{cases} 1-\epsilon & \text{if } a = \text{argmax } q*(s, a), \text{where } a \in A \\ \epsilon & \text{otherwise} \end{cases},$$

where $\pi(a|s)$ is the probability to take an action a under the state s, and $a=\text{argmax } q_*(s,a)$ is the best action under the state s. The greedy coefficient determines an amount of exploration by the process 600. Generally, for early stages of the process 600, more explorations should be performed to search for new optimal actions. As the process 600 executes over time, the process 600 finds more options that may be exploited and does not need much as much exploration. The greedy coefficient can be set to decrease along with the episodes (e.g., the number of executions) in some embodiments.

A reward value is determined when the new differential replication data has been transferred, as discussed above in conjunction with FIG. 5, for example. If the transfer time of the prior replication data transfer is less than a smallest permitted time gap (e.g., a smallest RPO for a given storage product) between initiation of two successive replication data transfers, then continue waiting until the transfer time of the prior replication data transfer exceeds the smallest permitted time gap and then update the state and continue. Otherwise, the state is updated and a reward value is assigned.

The action-value function, Q(S,A), and the new state are updated for each action selection. Through multiple iterations of values for each state-to-action, the process 600 determines the best action for each state. Hence, when a state comes, the process 600 knows the best action. T: the stipulated time set by customer (RPO).

Figure 7:
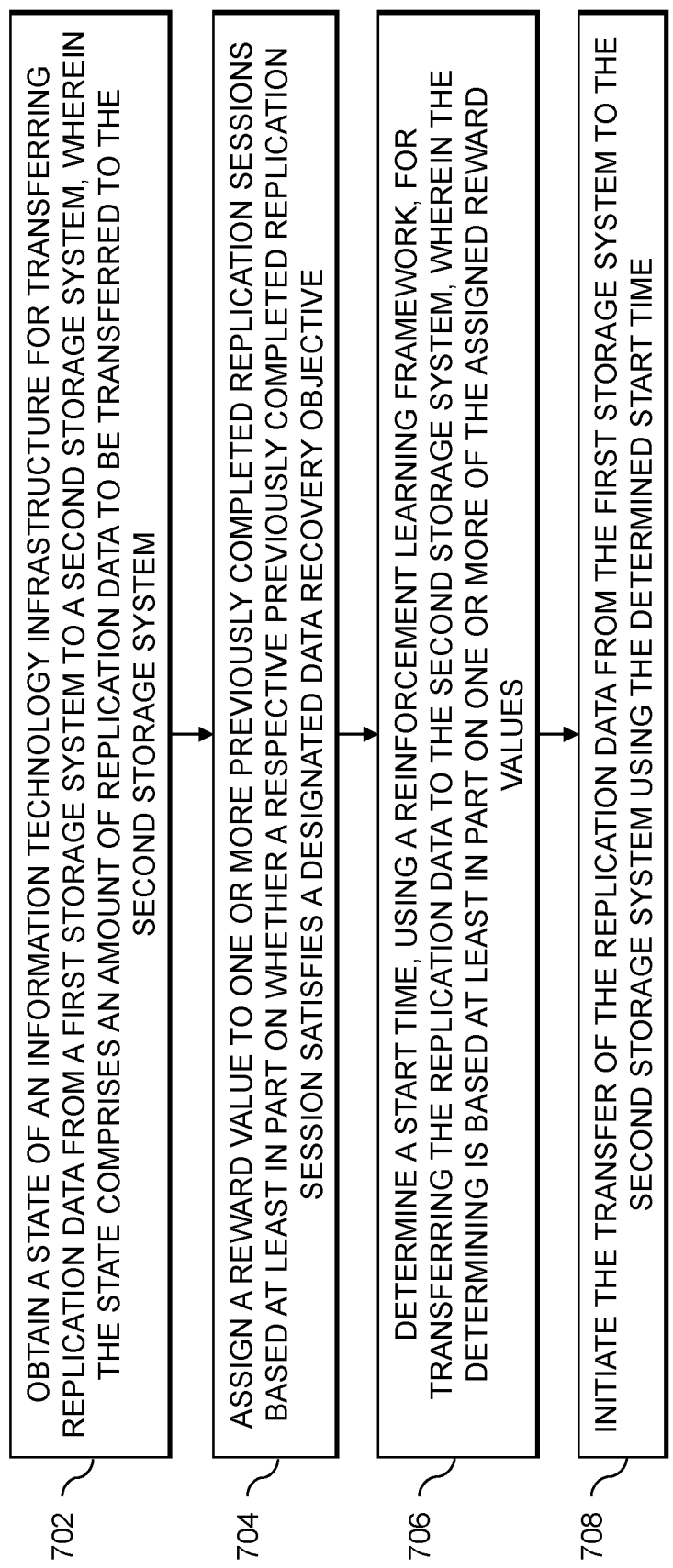
FIG. 7 is a flow diagram illustrating an exemplary implementation of a process for data replication using reinforcement learning to dynamically initiate the transfer of replication data in an illustrative embodiment.

FIG. 7 is a flow diagram illustrating an exemplary implementation of a process for data replication using reinforcement learning to dynamically initiate the transfer of replication data in an illustrative embodiment. In the example of FIG. 7, a state of an information technology infrastructure is obtained in step 702 for transferring replication data from a first storage system to a second storage system, wherein the state comprises an amount of replication data to be transferred to the second storage system. In step 704, a reward value is assigned to one or more previously completed replication sessions based at least in part on whether a respective previously completed replication session satisfies a designated data recovery objective. A start time is determined in step 706, using a reinforcement learning framework, for transferring the replication data to the second storage system, wherein the determining is based at least in part on one or more of the assigned reward values. The transfer of the replication data from the first storage system to the second storage system is initiated in step 708 using the determined start time.

In some embodiments, the reinforcement learning framework (e.g., the reinforcement learning framework discussed above in conjunction with FIG. 4) determines the start time using an action-value function (for example, Q(S,A), as described above), wherein the action-value function (i) characterizes an expected return for a given action and (ii) is based at least in part on the one or more reward values. The state may further comprise a number of concurrent replication sessions, and wherein the reward value for a given concurrent replication session is based at least in part on respective replication data transfer times of the plurality of concurrent replication sessions. The designated data recovery objective (e.g., an RPO) may be based at least in part on a designated amount of lost data, measured in units of time, due to a failure of one or more information technology assets in the information technology infrastructure.

In one or more embodiments, the amount of replication data to be transferred to the second storage system comprises a differential amount of data relative to a prior replication data transfer. The differential amount of data relative to the prior replication data transfer may be determined by comparing a refreshed snapshot to a base snapshot (for example, as discussed above in conjunction with FIG. 3). The designated data recovery objective may specify a permitted time difference between a beginning of a first replication transfer and an end of a second replication transfer.

In at least one embodiment, the assigning the reward value to the one or more previously completed replication sessions is based at least in part on an evaluation of a replication data accumulation time and a replication data transfer time.

The particular processing operations and other network functionality described in conjunction with FIGS. 6 and 7, for example, are presented by way of illustrative example only, and should not be construed as limiting the scope of the disclosure in any way. Alternative embodiments can use other types of processing operations to provide functionality for data replication using reinforcement learning to dynamically initiate the transfer of replication data. For example, the ordering of the process steps may be varied in other embodiments, or certain steps may be performed concurrently with one another rather than serially. In one aspect, the process can skip one or more of the actions. In other aspects, one or more of the actions are performed simultaneously. In some aspects, additional actions can be performed.

The disclosed dynamically initiated data replication techniques improve the reliability of asynchronous replication. It can be shown that as the number of concurrent replication sessions increases, the data transfer times increase and there is a greater risk of lost data. In addition, most episodes fall within the desired time range where a positive reward is assigned, and the proportion of total episodes less than the designated data recovery objective is close to or more than 90%. Further, the disclosed dynamically initiated data replication process has been found to converge in a desired manner for concurrent replication sessions. The lower limit on performance is waiting until the designated data recovery objective interval arrives to start the synchronization, in a similar manner as existing automatic replication modes.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement functionality for data replication using reinforcement learning to dynamically initiate the transfer of replication data will now be described in greater detail with reference to FIGS. 8 and 9. Although described in the context of information processing system 100, these platforms may also be used to implement at least portions of other information processing systems in other embodiments.

Figure 8:
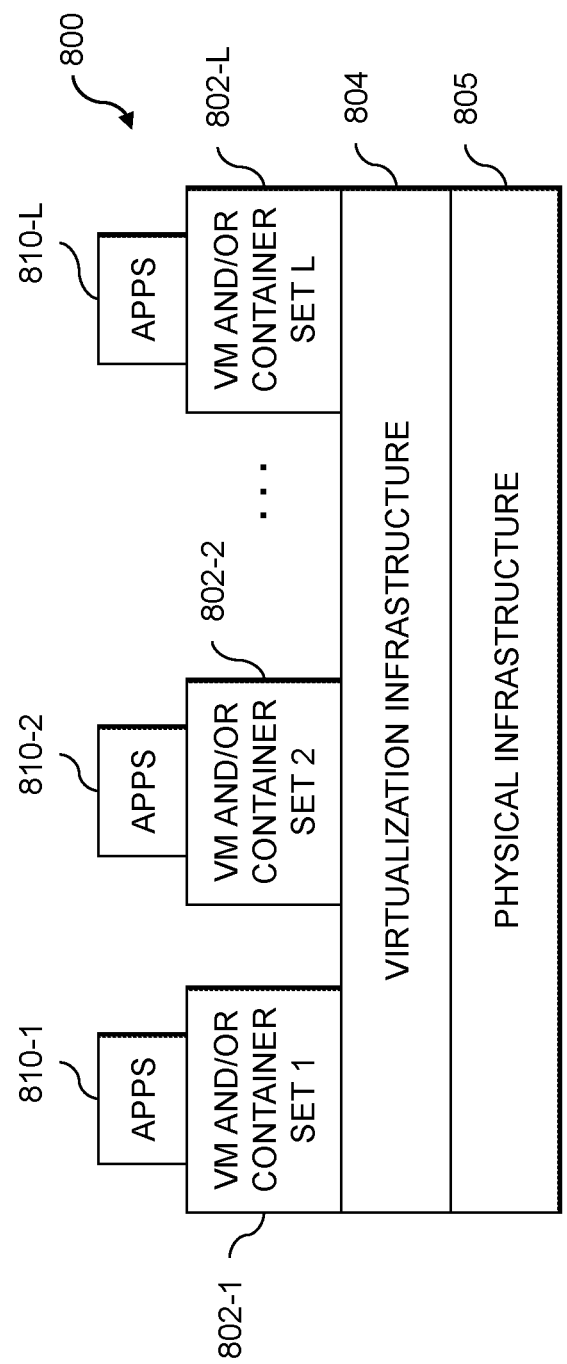
FIGS. 8 and 9 show examples of processing platforms that may be utilized to implement at least a portion of an information processing system in illustrative embodiments.
Figure 9:
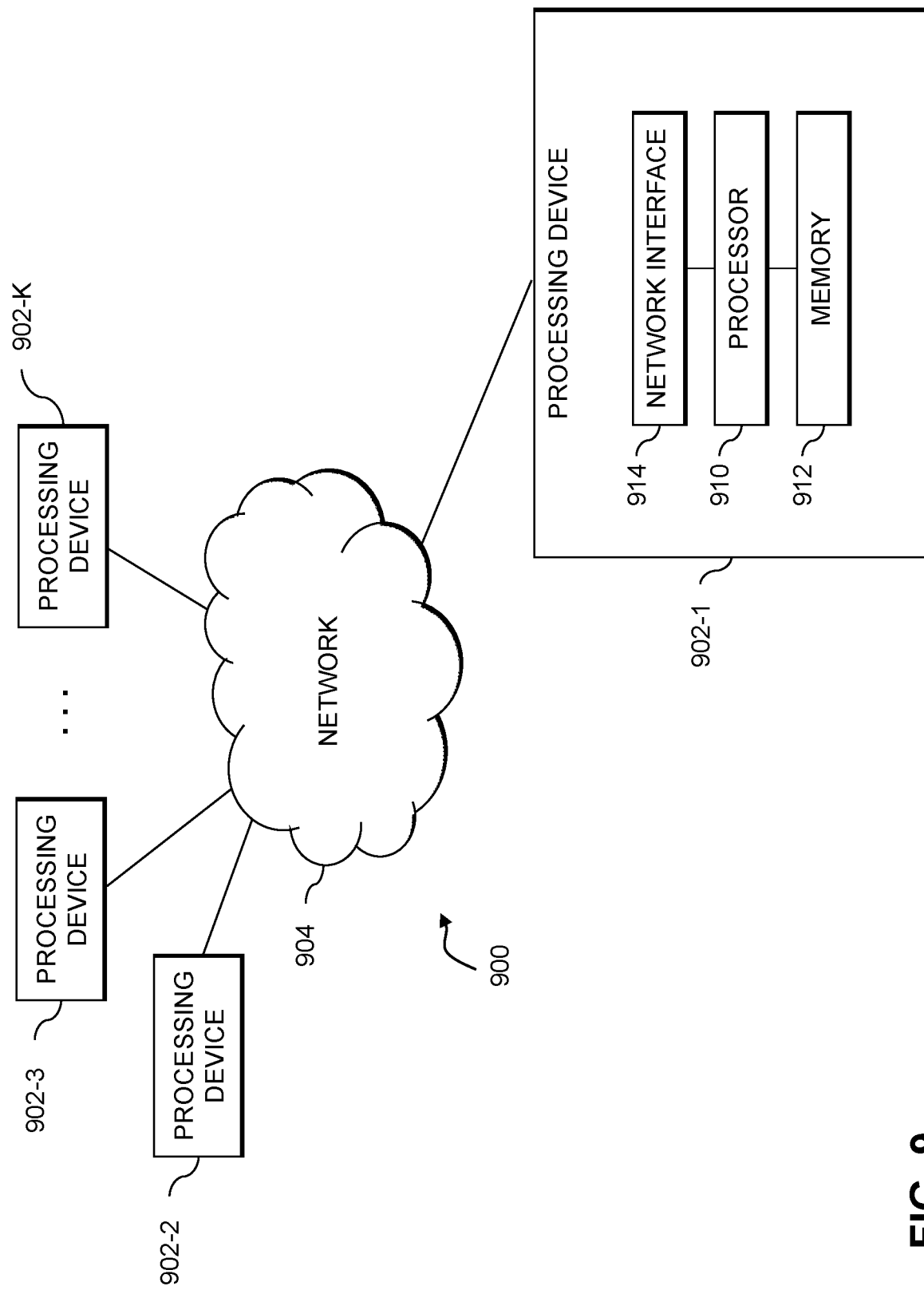

FIG. 8 shows an example processing platform comprising cloud infrastructure 800. The cloud infrastructure 800 comprises a combination of physical and virtual processing resources that may be utilized to implement at least a portion of the information processing system 100 in FIG. 1. The cloud infrastructure 800 comprises multiple virtual machines (VMs) and/or container sets 802-1, 802-2, . . . 802-L implemented using virtualization infrastructure 804. The virtualization infrastructure 804 runs on physical infrastructure 805, and illustratively comprises one or more hypervisors and/or operating system level virtualization infrastructure. The operating system level virtualization infrastructure illustratively comprises kernel control groups of a Linux operating system or other type of operating system.

The cloud infrastructure 800 further comprises sets of applications 810-1, 810-2 . . . 810-L running on respective ones of the VMs/container sets 802-1, 802-2 . . . 802-L under the control of the virtualization infrastructure 804. The VMs/container sets 802 may comprise respective VMs, respective sets of one or more containers, or respective sets of one or more containers running in VMs.

In some implementations of the FIG. 8 embodiment, the VMs/container sets 802 comprise respective VMs implemented using virtualization infrastructure 804 that comprises at least one hypervisor. A hypervisor platform may be used to implement a hypervisor within the virtualization infrastructure 804, where the hypervisor platform has an associated virtual infrastructure management system. The underlying physical machines may comprise one or more distributed processing platforms that include one or more storage systems.

In other implementations of the FIG. 8 embodiment, the VMs/container sets 802 comprise respective containers implemented using virtualization infrastructure 804 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of information processing system 100 may each run on a computer, server, storage device or other processing platform element. A given such element may be viewed as an example of what is more generally referred to herein as a "processing device." The cloud infrastructure 800 shown in FIG. 8 may represent at least a portion of one processing platform. Another example of such a processing platform is processing platform 900 shown in FIG. 9.

The processing platform 900 in this embodiment comprises a portion of information processing system 100 and includes a plurality of processing devices, denoted 902-1, 902-2, 902-3, . . . 902-K, which communicate with one another over a network 904.

The network 904 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 902-1 in the processing platform 900 comprises a processor 910 coupled to a memory 912.

The processor 910 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 912 may comprise random access memory (RAM), read-only memory (ROM), flash memory or other types of memory, in any combination. The memory 912 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 902-1 is network interface circuitry 914, which is used to interface the processing device with the network 904 and other system components, and may comprise conventional transceivers.

The other processing devices 902 of the processing platform 900 are assumed to be configured in a manner similar to that shown for processing device 902-1 in the figure.

Again, the particular processing platform 900 shown in the figure is presented by way of example only, and information processing system 900 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality for data replication using reinforcement learning to dynamically initiate the transfer of replication data as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method, comprising:
    obtaining a state of an information technology infrastructure for transferring replication data from a first storage system to a second storage system, wherein the state comprises an amount of replication data to be transferred to the second storage system;
    assigning a reward value to one or more previously completed replication sessions based at least in part on whether a respective previously completed replication session satisfies a designated data recovery objective;
    determining a start time, using a reinforcement learning framework, for transferring the replication data to the second storage system, wherein the determining is based at least in part on one or more of the assigned reward values; and
    initiating the transfer of the replication data from the first storage system to the second storage system using the determined start time;
    wherein the method is performed by at least one processing device comprising a processor coupled to a memory.

2. The method of claim 1, wherein the reinforcement learning framework determines the start time using an action-value function, wherein the action-value function (i) characterizes an expected return for a given action and (ii) is based at least in part on the one or more reward values.

3. The method of claim 1, wherein the amount of replication data to be transferred to the second storage system comprises a differential amount of data relative to a prior replication data transfer.

4. The method of claim 3, wherein the differential amount of data relative to the prior replication data transfer is determined by comparing a refreshed snapshot to a base snapshot.

5. The method of claim 1, wherein the state further comprises a plurality of concurrent replication sessions, and wherein the reward value for a given concurrent replication session is based at least in part on respective replication data transfer times of at least some of the plurality of concurrent replication sessions.

6. The method of claim 1, wherein the assigning the reward value to the one or more previously completed replication sessions is based at least in part on an evaluation of a replication data accumulation time and a replication data transfer time.

7. The method of claim 1, wherein the designated data recovery objective specifies a limit on a time difference between a beginning of a first replication transfer and an end of a second replication transfer.

8. The method of claim 1, wherein the designated data recovery objective is based at least in part on a designated amount of lost data, measured in units of time, due to a failure of one or more information technology assets in the information technology infrastructure.

9. An apparatus comprising:
    at least one processing device comprising a processor coupled to a memory, wherein the memory comprises program code;
    the at least one processing device being configured to execute the program code to cause the at least one processing device to implement the following steps:
    obtaining a state of an information technology infrastructure for transferring replication data from a first storage system to a second storage system, wherein the state comprises an amount of replication data to be transferred to the second storage system;
    assigning a reward value to one or more previously completed replication sessions based at least in part on whether a respective previously completed replication session satisfies a designated data recovery objective;
    determining a start time, using a reinforcement learning framework, for transferring the replication data to the second storage system, wherein the determining is based at least in part on one or more of the assigned reward values; and
    initiating the transfer of the replication data from the first storage system to the second storage system using the determined start time.

10. The apparatus of claim 9, wherein the reinforcement learning framework determines the start time using an action-value function, wherein the action-value function (i) characterizes an expected return for a given action and (ii) is based at least in part on the one or more reward values.

11. The apparatus of claim 9, wherein the amount of replication data to be transferred to the second storage system comprises a differential amount of data relative to a prior replication data transfer, wherein the differential amount of data relative to the prior replication data transfer is determined by comparing a refreshed snapshot to a base snapshot.

12. The apparatus of claim 9, wherein the state further comprises a plurality of concurrent replication sessions, and wherein the reward value for a given concurrent replication session is based at least in part on respective replication data transfer times of at least some of the plurality of concurrent replication sessions.

13. The apparatus of claim 9, wherein the assigning the reward value to the one or more previously completed replication sessions is based at least in part on an evaluation of a replication data accumulation time and a replication data transfer time.

14. The apparatus of claim 9, wherein the designated data recovery objective is based at least in part on a designated amount of lost data, measured in units of time, due to a failure of one or more information technology assets in the information technology infrastructure.

15. A non-transitory processor-readable storage medium having stored therein program code of one or more software programs, wherein the program code when executed by at least one processing device causes the at least one processing device to perform the following steps:
   obtaining a state of an information technology infrastructure for transferring replication data from a first storage system to a second storage system, wherein the state comprises an amount of replication data to be transferred to the second storage system;
   assigning a reward value to one or more previously completed replication sessions based at least in part on whether a respective previously completed replication session satisfies a designated data recovery objective;
   determining a start time, using a reinforcement learning framework, for transferring the replication data to the second storage system, wherein the determining is based at least in part on one or more of the assigned reward values; and
   initiating the transfer of the replication data from the first storage system to the second storage system using the determined start time.

16. The non-transitory processor-readable storage medium of claim 15, wherein the designated data recovery objective is based at least in part on a designated amount of lost data, measured in units of time, due to a failure of one or more information technology assets in the information technology infrastructure.

17. The non-transitory processor-readable storage medium of claim 15, wherein the assigning the reward value to the one or more previously completed replication sessions is based at least in part on an evaluation of a replication data accumulation time and a replication data transfer time.

18. The non-transitory processor-readable storage medium of claim 15, wherein the reinforcement learning framework determines the start time using an action-value function, wherein the action-value function (i) characterizes an expected return for a given action and (ii) is based at least in part on the one or more reward values.

19. The non-transitory processor-readable storage medium of claim 15, wherein the amount of replication data to be transferred to the second storage system comprises a differential amount of data relative to a prior replication data transfer, wherein the differential amount of data relative to the prior replication data transfer is determined by comparing a refreshed snapshot to a base snapshot.

20. The non-transitory processor-readable storage medium of claim 15, wherein the state further comprises a plurality of concurrent replication sessions, and wherein the reward value for a given concurrent replication session is based at least in part on respective replication data transfer times of at least some of the plurality of concurrent replication sessions.

* * * * *